United States Patent [19]
Davis

[11] Patent Number: 6,160,360
[45] Date of Patent: Dec. 12, 2000

[54] POWER CONTROL WITH REDUCED RADIO FREQUENCY INTERFERENCE

[75] Inventor: Daniel Davis, Jerusalem, Israel

[73] Assignee: The Amcor Group, Ltd., Long Island City, N.Y.

[21] Appl. No.: 09/470,783

[22] Filed: Dec. 23, 1999

Related U.S. Application Data

[60] Provisional application No. 60/113,906, Dec. 28, 1998.

[51] Int. Cl.$^7$ .................................................. G05F 1/00
[52] U.S. Cl. ..................... 315/297; 315/302; 315/360; 315/199; 323/271; 323/277
[58] Field of Search .................................. 315/199, 297, 315/302, 360, 362, DIG. 4; 323/235, 242, 271, 277, 237, 322, 905

[56] References Cited

U.S. PATENT DOCUMENTS

| | | |
|---|---|---|
| 3,793,557 | 2/1974 | Cramer . |
| 4,311,956 | 1/1982 | Tolmie, Jr. . |
| 4,454,462 | 6/1984 | Spann . |
| 4,823,069 | 4/1989 | Callahan et al. .......................... 323/235 |
| 5,243,261 | 9/1993 | Bergervoet et al. . |
| 5,248,919 | 9/1993 | Hanna et al. . |
| 5,319,301 | 6/1994 | Callahan et al. ......................... 323/235 |
| 5,798,581 | 8/1998 | Keagy et al. . |
| 5,841,246 | 11/1998 | Manders . |
| 5,861,720 | 1/1999 | Johnson .................................. 315/291 |

*Primary Examiner*—Haissa Philogene
*Attorney, Agent, or Firm*—Natter & Natter

[57] ABSTRACT

A circuit for controlling the power to a load such as motor or incandescent lamp with reduced radio frequency interference employs a microcontroller to trigger a power transistor into a conductive state for supplying power to the load. The power transistor is switched on and off at a controlled slew rate through an integrator circuit coupled between the microcontroller and the power transistor. A zero current detector circuit detects when no current is passing through the load during each half cycle of the live voltage to switch the power transistor off by generating an interrupt request signal which is supplied to the microcontroller. After an operator selected time interval, the microcontroller generates a signal to switch the transistor to a conductive state.

12 Claims, 1 Drawing Sheet

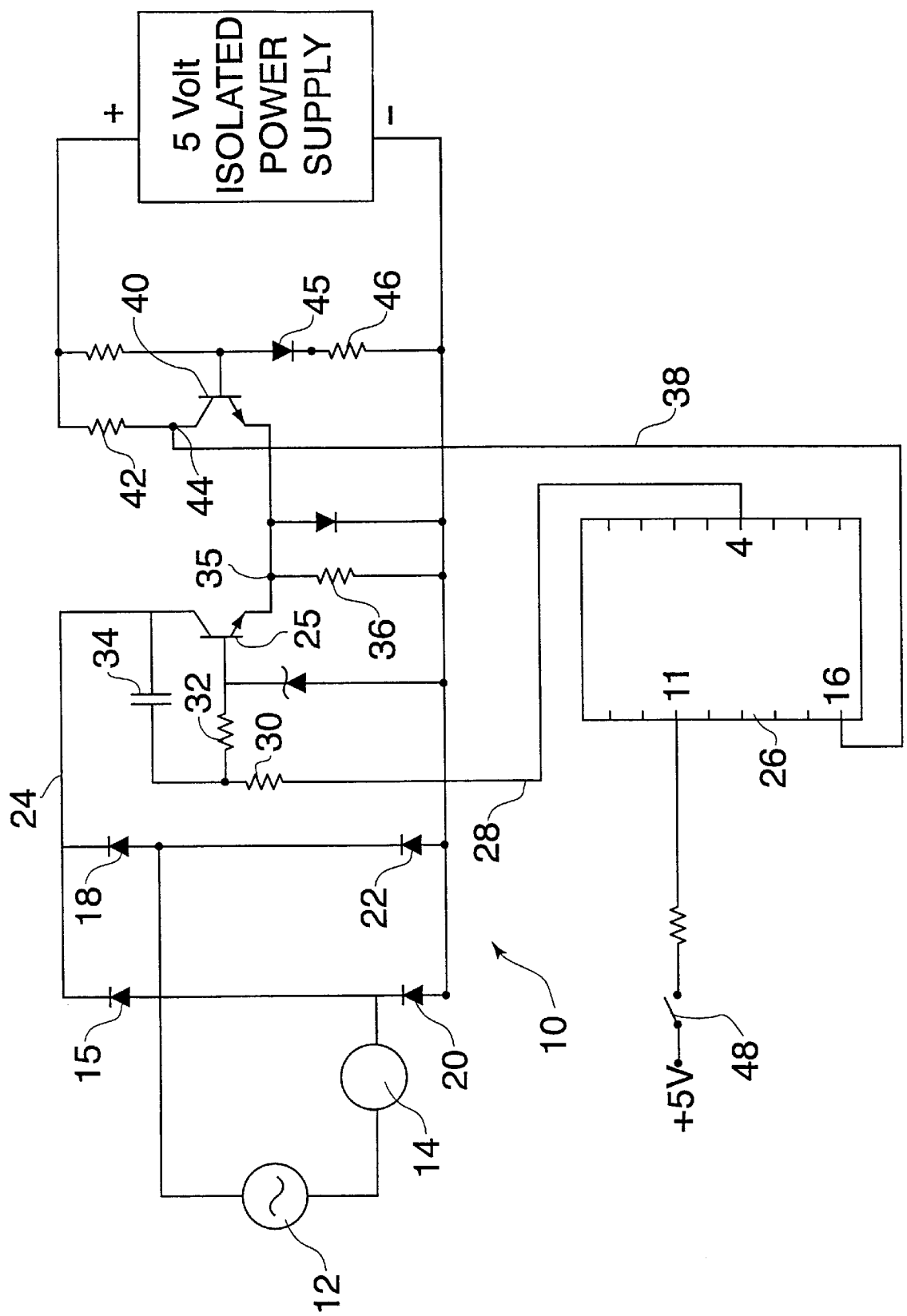

POWER CONTROL WITH REDUCED RADIO FREQUENCY INTERFERENCE

RELATED APPLICATIONS

This application claims the benefit of U.S. Provisional Application Ser. No. 60/113,906 filed Dec. 28, 1998.

FIELD OF THE INVENTION

This invention relates generally to power control systems for loads such as motors or lamps and more particularly to a power control system with reduced radio frequency interference.

BACKGROUND OF THE INVENTION

Prior power control circuits for typical applications such as motor speed control, incandescent lamp dimmers and the like generally employed thyristors such as triacs or silicon controlled rectifiers in series between an AC power source and the load. Assuming a sixty cycle/sec AC power source, current in the load passed through zero one hundred twenty times per second. Each time the load current passed through zero, the thyristor turned off.

An electronic timing circuit triggered the thyristor to turn on, i.e. established the thyristor firing angle, and thereby controlled the power to the load. If the timing circuit provided for no delay, full power was applied to the load. As the time delay increased, the load received less and less power.

Since just prior to thyristor turn-on, no current was delivered to the load and a relatively large current flow occurred immediately after thyristor turn-on, radio frequency interference resulted from the current transient.

One approach at reducing such radio frequency interference was the employment of an inductor in series with the load, as mentioned in U.S. Pat. No. 3,793,557 issued to CRAMER. The CRAMER patent disclosed a gapped core inductor with at least two air gaps in series with the thyristor and the load.

SUMMARY OF THE INVENTION

A power control circuit for a load includes a power transistor in series between an AC power supply source and the load. A microcontroller switches the transistor on at a controlled rate through a resistance-capacitance integrator circuit. A zero current detector circuit provides an interrupt signal to the microcontroller for initiating a time delay before the microcontroller generates a signal to switch the transistor back to a conducting state.

From the foregoing compendium, it will be appreciated that it is an aspect of the present invention to provide a power control of the general character described which is not subject to the disadvantages of the antecedents of the invention aforementioned.

It is a feature of the present invention to provide a power control of the general character described with reduced radio frequency interference.

A consideration of the present invention is to provide a power control of the general character described which is relatively low in cost.

A further aspect of the present invention is to provide a power control of the general character described which is well suited for low cost mass production fabrication.

Another consideration of the present invention is to provide a power control of the general character described which is simple to use.

Yet a further feature of the present invention is to provide a power control of the general character described which is well suited for a variety of load applications.

A further consideration of the present invention is to provide a power control of the general character described which is efficient in operation.

To provide a power control of the general character described which is well suited for motor speed control in low cost household appliances is a still further aspect of the present invention.

Other aspects, features and considerations of the present invention in part will be obvious and in part will be pointed out hereinafter.

With these ends in view, the invention finds embodiment in certain combinations of elements and arrangements of parts by which the said aspects, features and considerations and certain other aspects, features and considerations are hereinafter attained, all with reference to the accompanying drawings and the scope of which is more particularly pointed out and indicated in the appended claims.

BRIEF DESCRIPTION OF THE DRAWING

In the accompanying drawing in which is shown one of the various possible exemplary embodiments of the invention, the drawing FIGURE is a simplified schematic illustration of a typical power control circuit with reduced radio frequency interference constructed in accordance with and embodying the invention.

DESCRIPTION OF THE PREFERRED EMBODIMENT

Referring now in detail to the drawing, the reference numeral 10 denotes generally a power control circuit with reduced radio frequency interference constructed in accordance with and embodying the invention. The circuit 10 is operatively connected between an AC line source (mains) 12 and a load 14, such as a motor, for the purpose of controlling the current flowing through the load, e.g. the motor speed. It will be noted, from an examination of the drawing FIGURE, that the power control circuit 10 is connected in series between the load 14 and the AC line source 12. The circuit 10 is equally suited to control the power supply to other loads, such as incandescent lamps.

The control circuit 10 includes a plurality of diodes 15, 18, 20 and 22 configured as a bridge rectifier with the rectified voltage appearing on a pair of lines 23, 24. The power to the load 14 is switched on by a bipolar or a MOSFET power transistor 25 which allows current to flow through the load 14 when in a conductive state.

The power transistor 25 is controlled by a microcontroller chip 26, e.g. a Motorola MC68HC705JK1. Numerous other microcontrollers or timer circuits are equally well suited for employment in the present invention. A biasing signal on an output pin 4 of the microcontroller 26 extends through a line 28, and a pair of series resistors 30 and 32, to the base of the power transistor 25.

In accordance with the invention, the power transistor 25 is turned on at a gradual, rather than sudden, rate to reduce radio frequency interference. To control the rate of switching of the transistor 25, a capacitor 34 is positioned between the junction of the resistors 30, 32 and the collector of the power transistor 25.

The resistor-capacitor pair 30, 34 constitutes an integrator circuit which provides negative feedback to control the rate at which the power transistor turns on and off. The rate of switching of the power transistor 25, i.e. slew rate, is a function of the time constant of the resistor 30 and the capacitor 34.

With the power transistor 25 turned on, current flows from the power transistor 25 through a series resistor 36 to the load 14.

Since the control circuit employs a power transistor 25, rather than a thyristor, the control circuit 10 requires a zero current detection circuit. There are numerous commonly known zero current detection circuits which may be employed in conjunction with the present invention. The following should therefore be considered merely as an example.

A zero current detection circuit detects when zero current is passing through the power transistor 25 and the load 14, (which occurs in each half cycle of the AC power source), and provides a low signal to a pin 16 of the microcontroller 26 through a line 38.

The zero current detection circuit includes a transistor 40 whose emitter is interconnected to the resistor 36 at a junction point 35 in common with the emitter of the power transistor 25.

The collector of the transistor 40 is connected to a low voltage power supply through a resistor 42. When current is flowing through the power transistor 25 to the load 14, a voltage level is maintained at the junction point 35. When zero current is passing through the load 14 and the transistor 25, the voltage level at the junction point 35 decreases.

As a result, increased current flows through the transistor 40. The increase in current flow through the transistor 40 causes a reduction in the voltage level at a point 44, between the resistor 42 and the collector of the transistor 40. This reduced voltage level, or low signal, appears through the line 38, on an "interrupt-input" pin 16 of the microcontroller 26 and the microcontroller switches the high signal on the output pin 4 to low and commences a time delay cycle before generating a new high signal on the pin 4.

The transistor 40 is not forward biased when current is flowing through the power transistor 25 to the load 14 because the current flow through the power transistor 25 generates a relatively high voltage level at the junction point 35, i.e. at the emitter of the transistor 40, which is greater than the voltage level at a point 46, which is separated from the base of the transistor 40 by a diode 45. When the current flowing through the power transistor 25 and the load 14 approaches zero, however, the voltage level at the point 46 is greater than the voltage level at the junction point 35 and the transistor 40 becomes forward biased.

It should be appreciated that the microcontroller 26 is programmed with a plurality of different time delay values. Successive high input signals, appearing at a pin 11, in response to actuation of a switch 48, effects selection of the desired time delay value, hence selection of the amount of power to be applied to the load 14. For example, if the switch 48 is closed a first time, minimal power is applied, i.e. maximum time delay; closing the switch 48 a second time reduces the time delay, with the time delay being successively reduced on subsequent closing of the switch 48 until full power is applied.

Thus it will be seen that there is provided a power control with reduced radio frequency interference which achieves the various aspects, features and considerations of the present invention and which is well-suited to meet the conditions of practical usage.

Since various possible embodiments might be made of the present invention and since various changes might be made in the exemplary embodiment shown herein without departing from the spirit of the invention, it should be understood that all matter herein described or shown in the accompanying drawing should be interpreted as illustrative and not in a limiting sense.

What is claimed is:

1. A power control circuit for adjustably varying the power to a load from an AC line source with reduced radio frequency interference, the power control circuit comprising a power transistor having a base, a collector and an emitter, the collector and the emitter being coupled in series between the AC line source and the load, the power control circuit further including a timer circuit for generating a time delayed forward biasing signal, a first resistor connected in series between the timer circuit and the base of the power transistor and a capacitor connected between the collector of the power transistor and the first resistor, the first resistor and the capacitor providing a negative feedback circuit whereby the power transistor is switched on at a rate determined by the first resistor and the capacitor for reduced radio frequency interference.

2. A power control circuit for adjustably varying the power to a load from an AC line source with reduced radio frequency interference as constructed in accordance with claim 1 further including a second resistor, the second resistor being series connected between the base of the power transistor and the first resistor, the capacitor being connected to the base of the power transistor in series with the second resistor and to the timer circuit in series with the first resistor.

3. A power control circuit for adjustably varying the power to a load from an AC line source with reduced radio frequency interference as constructed in accordance with claim 1 further including a zero current detection circuit, the zero current detection circuit being operatively connected to the power transistor for detecting zero current flow through the power transistor, the zero current detecting circuit being operatively connected to the timer circuit for terminating the forward biasing signal and initiating a time delay upon detection of zero current flow.

4. A power control circuit for adjustably varying the power to a load from an AC line source with reduced radio frequency interference as constructed in accordance with claim 1 wherein the timer circuit comprises a microcontroller.

5. A power control circuit for adjustably varying the power to a load from an AC line source with reduced radio frequency interference as constructed in accordance with claim 3 wherein the timer circuit comprises a microcontroller, the zero current detection circuit being operatively connected to the microcontroller, the zero current detection circuit generating an interrupt signal upon detection of zero current flow through the power transistor, the microcontroller receiving the interrupt signal and response thereto, terminating the forward biasing signal and initiating a time delay.

6. A power control circuit for adjustably varying the power to a load from an AC line source with reduced radio frequency interference as constructed in accordance with claim 3 wherein the zero current detection circuit includes a second transistor having a second collector, a second emitter and a second base, the second collector being series connected to a low voltage supply source through a third resistor, the second emitter being connected to the power transistor emitter, the voltage at the power transistor emitter being decreased and increased current flowing between the second collector and the second emitter when zero current flows through the power transistor, the voltage level at the junction between the third resistor and the second collector being decreased when increased current flows through the second transistor, said decreased voltage level constituting a low signal for initiating the time delay.

7. A power control circuit for adjustably varying the power to a load from an AC line source with reduced radio frequency interference, the power control circuit comprising a power transistor having a base, a collector and an emitter, the collector and the emitter being coupled in series between the AC line source and the load, the power control circuit further including a microcontroller having an output for generating a forward biasing signal, a resistance-capacitance integrator circuit interconnecting the microcontroller output and the base of the power transistor, the integrator circuit providing negative feedback whereby the power transistor is switched on at a controlled rate for reduced radio frequency interference.

8. A power control circuit for adjustably varying the power to a load from an AC line source with reduced radio frequency interference as constructed in accordance with claim 7 wherein the resistance-capacitance integrator circuit comprises a first resistor connected between the microcontroller output and the base of the power transistor and a capacitor connected between the collector of the power transistor and the first resistor.

9. A power control circuit for adjustably varying the power to a load from an AC line source with reduced radio frequency interference as constructed in accordance with claim 8 further including a second resistor, the second resistor being series connected between the base of the power transistor and the first resistor, the capacitor being connected to the base of the power transistor in series with the second resistor and to the microcontroller output in series with the first resistor.

10. A power control circuit for adjustably varying the power to a load from an AC line source with reduced radio frequency interference as constructed in accordance with claim 8 further including a zero current detection circuit operatively connected to the power transistor for detecting zero current flow through the power transistor, the zero current detecting circuit being operatively connected to a microcontroller input for terminating the forward biasing signal and initiating a time delay upon detection of zero current flow.

11. A power control circuit for adjustably varying the power to a load from an AC line source with reduced radio frequency interference as constructed in accordance with claim 10 wherein the zero current detection circuit generates an interrupt signal upon detection of zero current flow through the power transistor, the microcontroller receiving the interrupt signal and response thereto, terminating the forward biasing signal and initiating a time delay whereby the power transistor is switched off at a controlled rate.

12. A power control circuit for adjustably varying the power to a load from an AC line source with reduced radio frequency interference as constructed in accordance with claim 11 wherein the zero current detection circuit includes a second transistor having a second collector, a second emitter and a second base, the second collector being series connected to a low voltage supply source through a third resistor, the second emitter being connected to the power transistor emitter, the voltage at the power transistor emitter being decreased and increased current flowing between the second collector and the second emitter when zero current flows through the power transistor, the voltage level at the junction between the third resistor and the second collector being decreased when increased current flows through the second transistor, said decreased voltage level constituting the interrupt signal.

* * * * *